US012321116B2

(12) United States Patent
Han et al.

(10) Patent No.: US 12,321,116 B2
(45) Date of Patent: Jun. 3, 2025

(54) FUSER COMPRISING HEAT TRANSFER MEMBER FOR PREVENTING OVERHEAT OF FUSING BELT

(71) Applicant: Hewlett-Packard Development Company, L.P., Spring, TX (US)

(72) Inventors: Seunghun Han, Seongnam-si (KR); Dongkyun Kim, Seongnam-si (KR); Semin An, Seongnam-si (KR); Kiwon Park, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/693,296

(22) PCT Filed: Sep. 15, 2022

(86) PCT No.: PCT/US2022/043616

§ 371 (c)(1),
(2) Date: Mar. 19, 2024

(87) PCT Pub. No.: WO2023/049011

PCT Pub. Date: Mar. 30, 2023

(65) Prior Publication Data

US 2024/0385558 A1 Nov. 21, 2024

(30) Foreign Application Priority Data

Sep. 24, 2021 (KR) ........................ 10-2021-0126087

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
USPC .......................................................... 399/324
See application file for complete search history.

(56) References Cited

U.S. PATENT DOCUMENTS

| | | | | |
|---|---|---|---|---|
| 2011/0206427 | A1 | 8/2011 | Iwaya et al. | |
| 2012/0155936 | A1 | 6/2012 | Yamaguchi et al. | |
| 2013/0279955 | A1 * | 10/2013 | Maeda | G03G 15/2053 399/329 |
| 2021/0333731 | A1 | 10/2021 | Shimura | |

FOREIGN PATENT DOCUMENTS

| | | | |
|---|---|---|---|
| EP | 2466391 | A1 | 6/2012 |
| EP | 2711778 | A2 | 3/2014 |
| JP | 2005-084017 | A | 3/2005 |
| JP | 2016-089366 | A | 5/2016 |
| WO | 2019/124664 | A1 | 6/2019 |
| WO | 2021/183231 | A1 | 9/2021 |

* cited by examiner

*Primary Examiner* — Quana Grainger
(74) *Attorney, Agent, or Firm* — Foley & Lardner LLP

(57) ABSTRACT

An example fuser includes a rotatable pressure roller, a fusing belt to externally contact the pressure roller, a heater inside the fusing belt to heat the fusing belt, a nip plate including a surface facing the pressure roller to internally contact the fusing belt, a nip forming member inside the fusing belt to press the nip plate toward the pressure roller, and a heat transfer member, between the nip plate and the nip forming member, comprising a first area corresponding to a maximum width of a printing medium that is to pass the fuser and a second area at both sides of the first area.

11 Claims, 8 Drawing Sheets

FUSER COMPRISING HEAT TRANSFER MEMBER FOR PREVENTING OVERHEAT OF FUSING BELT

CROSS-REFERENCE TO RELATED APPLICATIONS

This application is a National Stage Application under 35 U.S.C. § 371 of PCT/US2022/043616, filed Sep. 15, 2022, which claims priority to Korean Patent Application No. 10-2021-0126087, filed Sep. 24, 2021, which are hereby incorporated by reference in their entireties.

BACKGROUND

An image forming apparatus may refer to an apparatus that is to print an image on a printing medium, and may correspond to a printer, a copier, a facsimile, a scanner, a multi-function printer which is implemented by combining functions of a printer, a copier, a facsimile, and a scanner, and the like. An electrophotographic image forming apparatus may form a developer image corresponding to printing data on the printing medium, and use a fuser to apply a predetermined amount of heat and pressure to the developer image to fuse the developer image on the printing medium.

The fuser may have a nip forming structure based on a fusing belt, that is heated by a heater, contacting an outer surface of a rotating pressure roller. Based on paper passing through the nip between the fusing belt and the pressure roller, toner which has been transferred to the paper may be fused to the paper by the pressure and heat.

DETAILED DESCRIPTION

Various examples will be described below with reference to the accompanying drawings. However, the examples described herein may be modified and implemented in various different forms.

In the disclosure, in a situation in which an element is indicated as being "connected" to another element, the element may be 'directly connected,' and may also be 'connected through another element therebetween.' In addition, in a situation in which a certain element is indicated as "including," or "comprising" another element, this includes a situation in which still another element may be additionally included rather than precluding other elements, unless otherwise specified.

In the disclosure, an "image forming apparatus" may refer to an apparatus that is to print printing data generated in a terminal apparatus such as a computer on a recording printing medium such as paper. Examples of the image forming apparatus may include a copier, a printer, a facsimile, a scanner, a multi-function printer (MFP) which implements in combination functions of a copier, a printer, a facsimile, and a scanner through an apparatus, or the like.

The examples described below are merely provided to assist in the understanding of the disclosure, and it should be understood that the disclosure may be realized in various modifications different from the examples described herein.

In describing the disclosure below, to assist in the understanding of the disclosure, the accompanied drawings may not be illustrated to actual scale, and some examples may be illustrated exaggerated in dimension.

In a fuser, a center area of a fusing belt through which a printing medium (e.g., paper) is to pass may transfer heat to the paper and toner to fuse a toner image to the paper. However, end areas of the fusing belt through which paper is not passed may merely receive heat and supply the heat into a surrounding environment. Accordingly, the end areas of the fusing belt may be damaged by being overheated as compared to the center area. To address this issue, an example fuser may include a heat transfer member.

In an example, because heat moves from both end areas to the center area of the heat transfer member, the fusing belt may be designed such that damage is prevented and a life span is increased based on more equally maintaining a temperature of a whole area of the fusing belt. In that case, an efficiency of the fuser is increased because the heat which is moved to the center area is used for fusing the toner.

Figure 1:
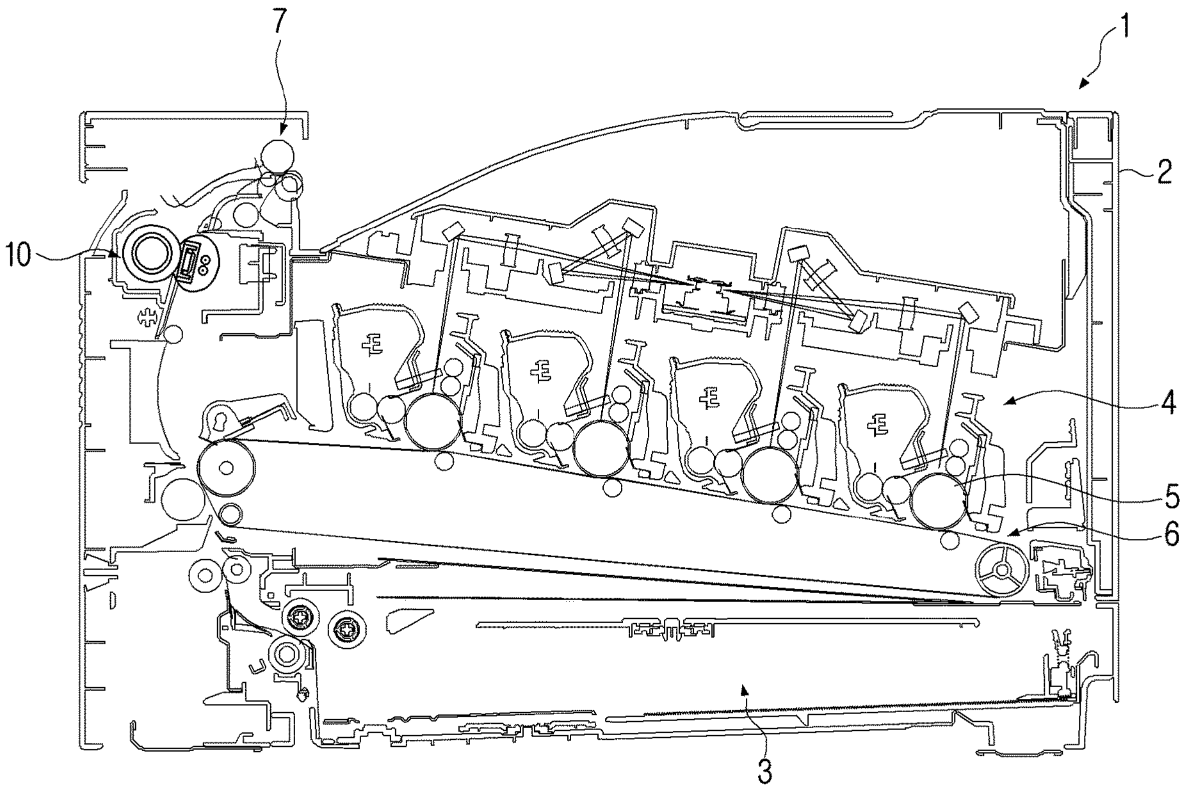
FIG. 1 is a cross-sectional view schematically illustrating an image forming apparatus according to an example.

FIG. 1 is a cross-sectional view schematically illustrating an image forming apparatus according to an example.

Referring to FIG. 1, the image forming apparatus 1 may include a main body 2, a paper feeder 3, a development device 4, a plurality of photosensitive drums 5, a transfer device 6, a paper discharging device 7, an optical scanner (not shown), and a fuser 10.

The main body 2 may form an appearance of the image forming apparatus 1, and support various components installed therein. A part (e.g., a door) of the main body 2 may be provided to be opened and closed, and a user may replace or repair various components, or remove paper jammed inside the main body through the opened part of the main body 2.

The paper feeder 3 may supply paper toward the transfer device 6. For example, the paper feeder 3 may include a cassette in which paper may be stored, a pick-up roller to pick-up paper stored in the cassette one by one, and a transfer roller to transfer the picked-up paper toward the transfer device 6.

The optical scanner may irradiate a photosensitive drum 5 with light corresponding to image information to form an electrostatic latent image on a surface of the photosensitive drum 5.

The development device 4 may supply a toner, which is a developer, to the electrostatic latent image formed on the photosensitive drum 5 to form a visualized toner image (i.e., a visible image). The development device 4 may be formed of four developing devices respectively containing developers with colors different from each other, for example, developers with black (K), cyan (C), magenta (M), and yellow (Y) colors.

Although the image forming apparatus 1 shown in FIG. 1 illustrates an example in which four photosensitive drums 5 are included, other examples are possible in which the four developing devices may form a visualized image on one photosensitive drum 5, differently from the above described example.

The transfer device 6 may receive the visible image formed on the photosensitive drum 5 and transfer the visible image to the paper.

In an example in which the image forming apparatus 1 is to perform a color printing operation, transfer rollers may be pressurized toward the respective photosensitive drums 5. Accordingly, each visualized color image formed on the photosensitive drum 5 may be transferred to a transfer belt by the transfer rollers and superimposed. In that case, the image on the transfer belt may be transferred to the paper that is fed from the paper feeder 3 and passes between the transfer rollers and the transfer belt.

The paper having passed through the transfer device 6 may enter the fuser 10. The fuser 10 may apply heat and pressure to the paper to fix an unfixed toner image onto the paper.

The paper having passed through the fuser 10 may be guided to the paper discharging device 7, and the paper discharging device 7 may discharge paper out of the image forming apparatus 1. In an example, the paper discharging device 7 may include a discharge roller and a discharge back-up roller installed to oppose the discharge roller.

An example of the fuser 10 provided in the image forming apparatus 1 according will be described below.

Figure 2:
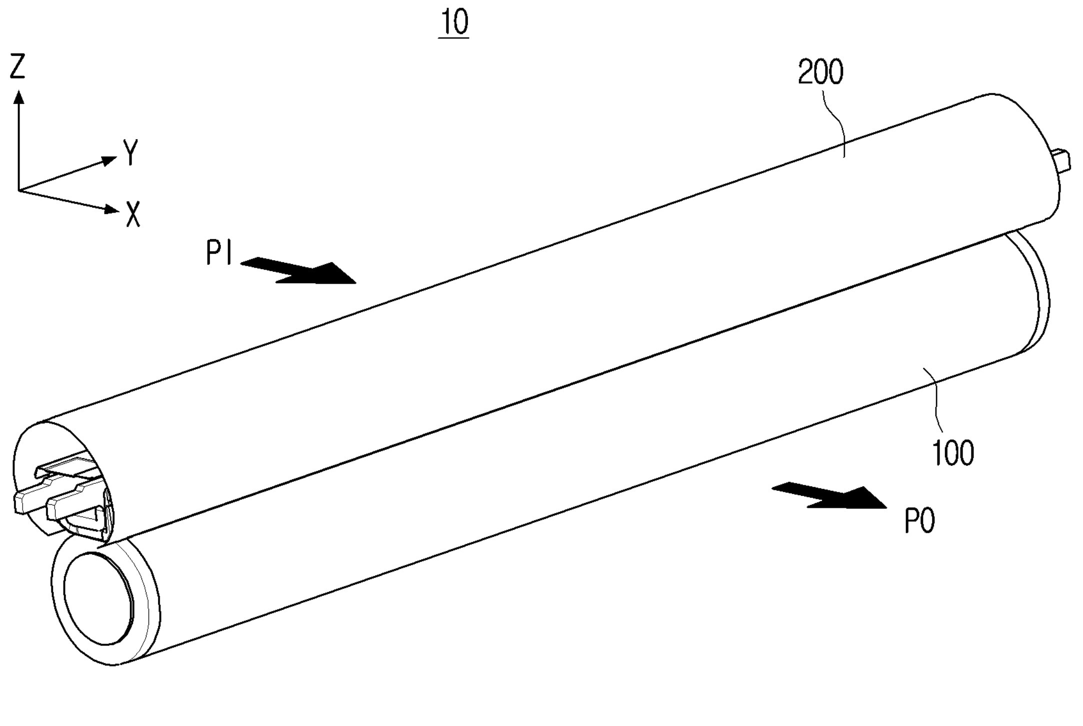
FIG. 2 is a perspective view of a fuser according to an example.
Figure 3:
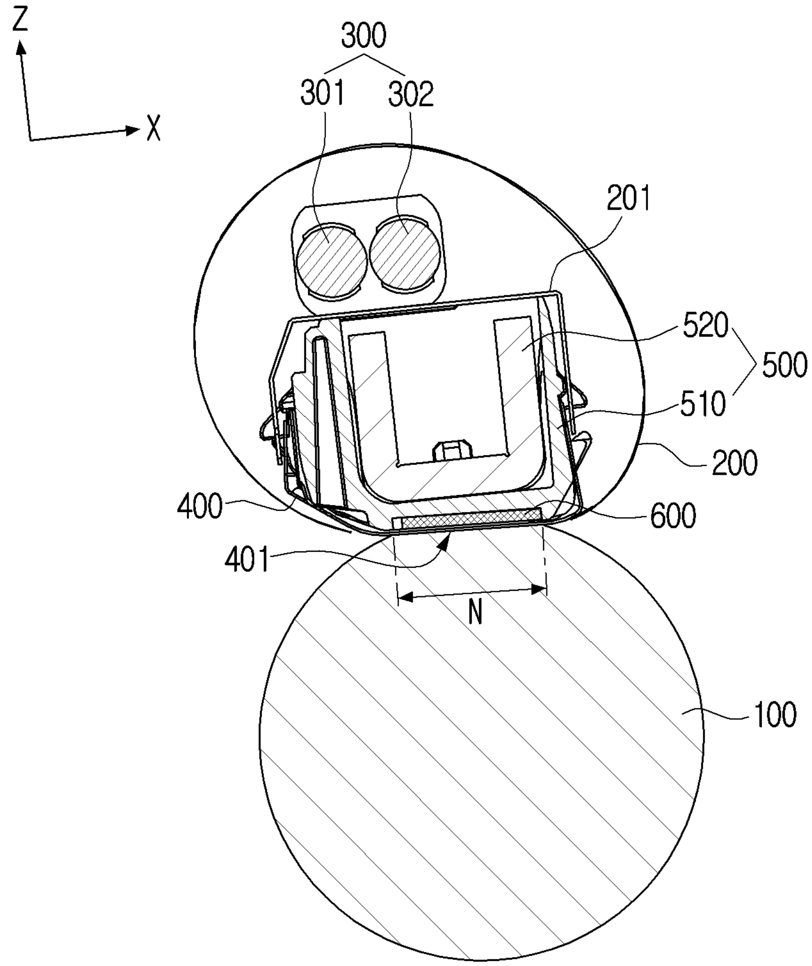
FIG. 3 is a cross-sectional view illustrating an inner structure of the fuser of FIG. 2 according to an example.

FIG. 2 is a perspective view of a fuser according to an example. FIG. 3 is a cross-sectional view illustrating an inner structure of the fuser of FIG. 2 according to an example.

Referring to FIG. 2 and FIG. 3, the fuser 10 may include a pressure roller 100, a fusing belt 200, a heater 300, a nip plate 400, a nip forming member 500, and a heat transfer member 600.

A printing medium (e.g., paper) may be introduced into the fuser 10 along a paper-in (PI) direction and pass through the fuser 10 to be drawn out in a paper-out (PO) direction. The PI direction and the PO direction may be directions that are parallel with a common tangential line of the pressure roller 100 and the fusing belt 200, and may both be directions parallel with an X axis. However, the direction and orientation are not limited thereto.

The pressure roller 100 may include a roller provided to be rotatable, and may pressurize the paper passing through a fusing nip N. The pressure roller 100 may rotate by receiving power from a driving device mounted to the main body 2 of the image forming apparatus 1.

In the process of the paper passing through the fusing nip N between the pressure roller 100 and the fusing belt 200, the toner image transferred onto the paper may be fixed onto the paper by heat and pressure.

The pressure roller 100 may be disposed with an elastic layer at an outermost side, and may be elastically deformed at the time of pressurization of the pressing roller 100 and the fusing belt 200 to form the fusing nip N between the elastic layer and the fusing belt 200. An outer surface of the elastic layer may be formed with a release layer that is to prevent paper from sticking to the pressure roller 100. The release layer may include, for example, perfluoroalkoxy (PFA), polytetrafluoroethylenes (PTFE), fluorinated ethylene prophylene (FEP), a blend of two or more, a copolymer thereof, or the like.

The fusing belt 200 may externally contact the pressure roller 100 and may passively rotate due to the pressure and rotation of the pressure roller 100. The fusing belt 200 may have an endless shape, but is not limited thereto. For example, the fusing belt 200 may be in a wound structure by a pair of rollers in a shape of a film having an end part.

The fusing belt 200 may be heated by the heater 300 disposed inside of the fusing belt 200 and may transfer heat to the paper which passes through the fusing nip N between the fusing belt 200 and the pressure roller 100. The fusing belt 200 may include a single layer of a metal, a heat resistant polymer, or the like. In an example, the fusing belt 200 may include the elastic layer and a protective layer added to a base layer formed of a metal or a heat resistant polymer.

A reflecting plate 201, the heater 300, the nip plate 400, the nip forming member 500, and the heat transfer member 600 may be disposed inside the fusing belt 200.

The heater 300 may be disposed inside the fusing belt 200 to heat the fusing belt 200. The heater 300 may be disposed at an opposite side of the nip forming member 500 that is facing the pressure roller 100.

The heater 300 may generate heat used to fuse an image, and may include a heat lamp (e.g., halogen lamp), a heat resistor, or the like. The heater 300 may be disposed along a rotation axis of the fusing belt 200 inside the fusing belt 200. The heater 300 may include a pair of heat lamps 301 and 302 that are in parallel with each other, but is not limited thereto.

The reflecting plate 201 may be disposed between the heater 300 and the nip forming member 500, and may surround the nip forming member 500. Accordingly, because the heater 300 and the nip forming member 500 are not in direct contact, the nip forming member 500 may not be excessively heated by the heater 300. In that case, damage to the heater 300 by the nip forming member 500 may be prevented.

The reflecting plate 201 may reflect heat radiated from the heater 300 toward the fusing belt 200. Accordingly, because heat radiated from the heater 300 is used to heat the fusing belt 200, heating efficiency of the heater 300 may be increased.

In an example, one surface 401 of the nip plate 400 facing the pressure roller 100 may internally contact the fusing belt 200. The nip plate 400 may be disposed between the nip forming member 500 and the fusing belt 200. The nip plate 400 may prevent the nip forming member 500 from being in direct contact with the fusing belt 200, and may prevent excessive friction resistance from occurring between the nip forming member 500 and the fusing belt 200.

The nip forming member 500 may be disposed inside the fusing belt 200 and pressurize the nip plate 400 toward the pressure roller 100. The nip forming member 500 may form the fusing nip N between the pressure roller 100 and the fusing belt 200.

The nip forming member 500 may guide the fusing belt 200 so that the fusing belt 200 travels smoothly near the fusing nip N. In an example, a cross-section of the nip forming member 500 may be formed as a channel having a "U" shape with a flat bottom.

The nip forming member 500 may include an inner holder 510 and a pressing member 520. The inner holder 510 may include a liquid crystal polymer (LCP), polyetheretherketone (PEEK), polyphenylene sulfide (PPS), or the like which are heat-resistant resins.

In an example, both ends of the pressing member 520 may be supported by a bushing (not shown) located at both ends of the fusing belt 200. The pressing member 520 may have a shape of a channel having an end surface of a U shape with roughly a flat bottom, and may be located inside of the inner holder 510. The pressing member 520 may have a structure with a large cross-section moment of inertia such as an I-shaped beam, an H-shaped beam, or the like in addition to the U shape with the flat bottom.

The heat transfer member 600 may be disposed between the nip plate 400 and the nip forming member 500. The heat transfer member 600 may be disposed along the rotation axis of the fusing belt 200 inside the fusing belt 200. The heat transfer member 600 may have a length corresponding to a length of the nip forming member 500.

A cross-section of the heat transfer member 600 may have a rectangle shape. The heat transfer member 600 may have a shape of a thin plate having a short length in a paper transfer direction (e.g., X axis direction) and a long length in the rotation axis direction (e.g., Y axis direction) of the fusing belt 200. An example structure of the heat transfer member 600 will be described below.

Figure 4:
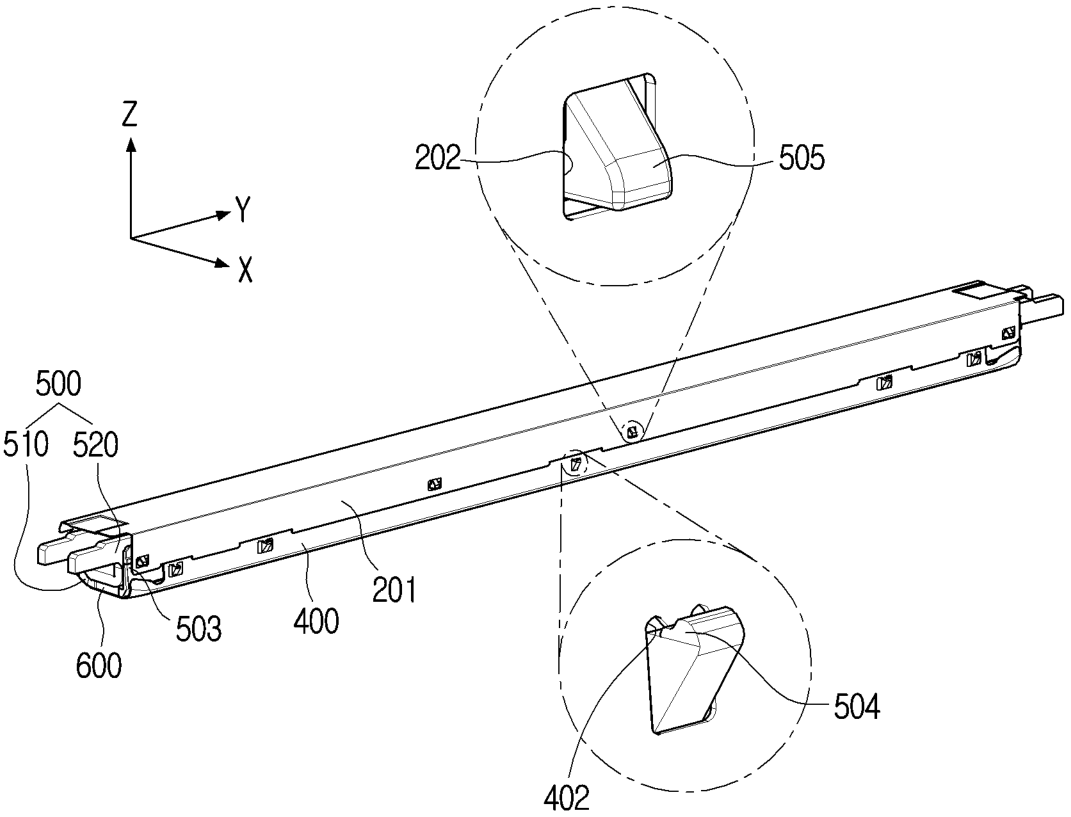
FIG. 4 and FIG. 5 are a perspective view and an exploded perspective view respectively illustrating an internal structure of a fuser according to an example.
Figure 5:
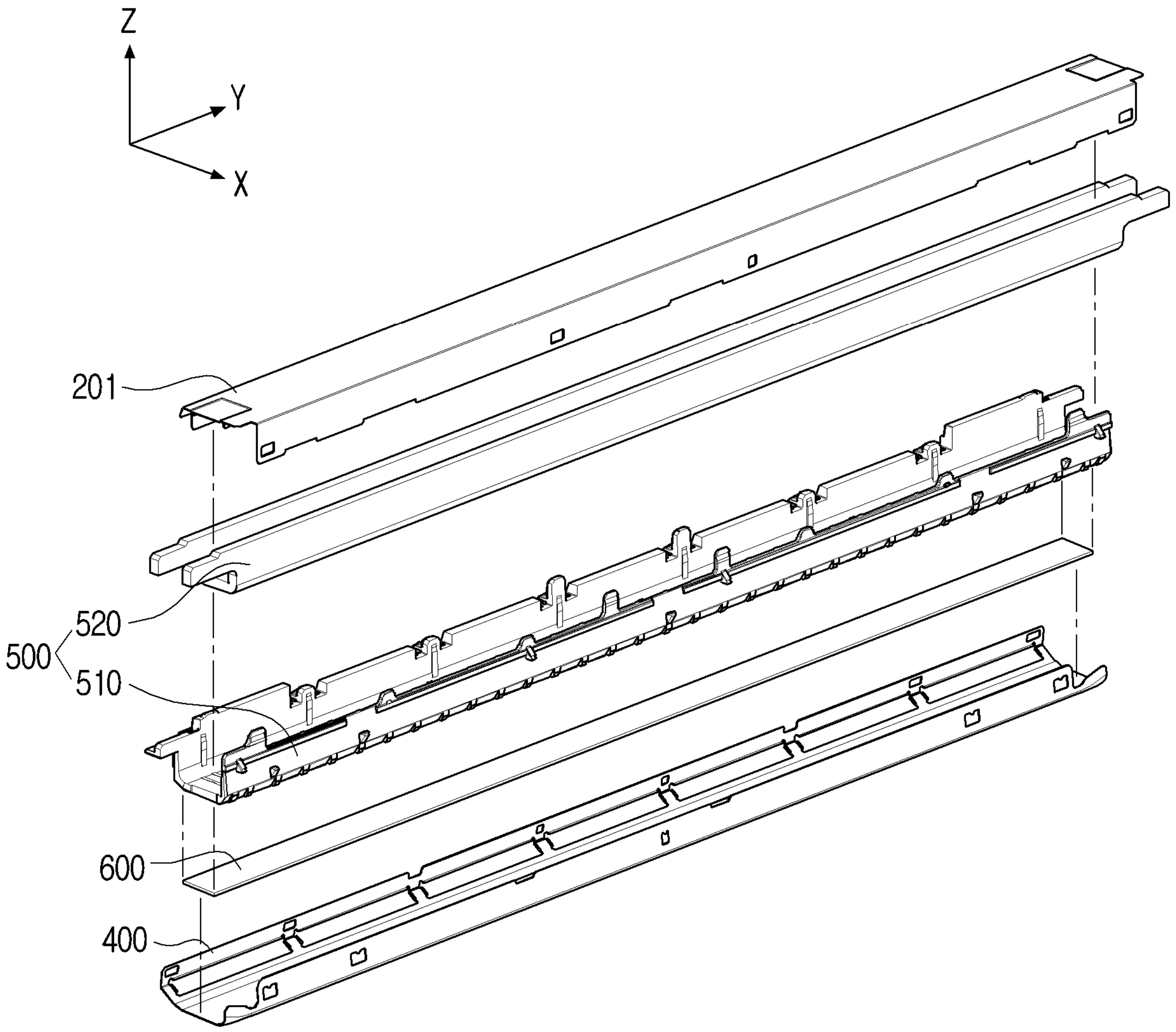

FIG. 4 and FIG. 5 are a perspective view and an exploded perspective view respectively illustrating an internal structure of a fuser according to an example.

Referring to FIG. 4 and FIG. 5, the nip plate 400, the heat transfer member 600, the inner holder 510, the pressing member 520, and the reflecting plate 201 may be sequentially stacked along a Z axis.

The nip forming member 500 may include a fastening protrusion 504 protruding from both side surfaces 503. In addition, the nip plate 400 may include a fastening hole 402 through which the fastening protrusion 504 may pass. Accordingly, the nip plate 400 may be stably coupled to the nip forming member 500.

The fastening protrusion 504 may further protrude from the side surface 503 of the nip forming member 500 as it is disposed farther from the pressure roller 100. Accordingly, because the fastening protrusion 504 may be caught in the fastening hole 402, the nip plate 400 may be stably fixed to the nip forming member 500 without being separated from the nip forming member 500 in a −Z direction. In addition, based on fastening the nip plate 400 to the nip forming member 500, because both side surfaces of the nip plate 400 are parted along an inclined surface of the fastening protrusion 504 as it moves in a +Z direction, the fastening protrusion 504 may be smoothly inserted in the fastening hole 402 and the nip plate 400 may be easily fastened to the nip forming member 500.

The nip forming member 500 may include an additional fastening protrusion 505 protruding from both side surfaces 503. In addition, the reflecting plate 201 may include a fastening hole 202 through which the additional fastening protrusion 505 may pass. Accordingly, the reflecting plate 201 may be stably coupled to the nip forming member 500.

The additional fastening protrusion 505 may further protrude from the side surface 503 of the nip forming member 500 as it is disposed closer to the pressure roller 100. Accordingly, because the additional fastening protrusion 505 is caught in the fastening hole 202, the reflecting plate 201 may not be separated from the nip forming member 500 in the +Z direction, and may be stably fixed to the nip forming member 500.

Figure 6:
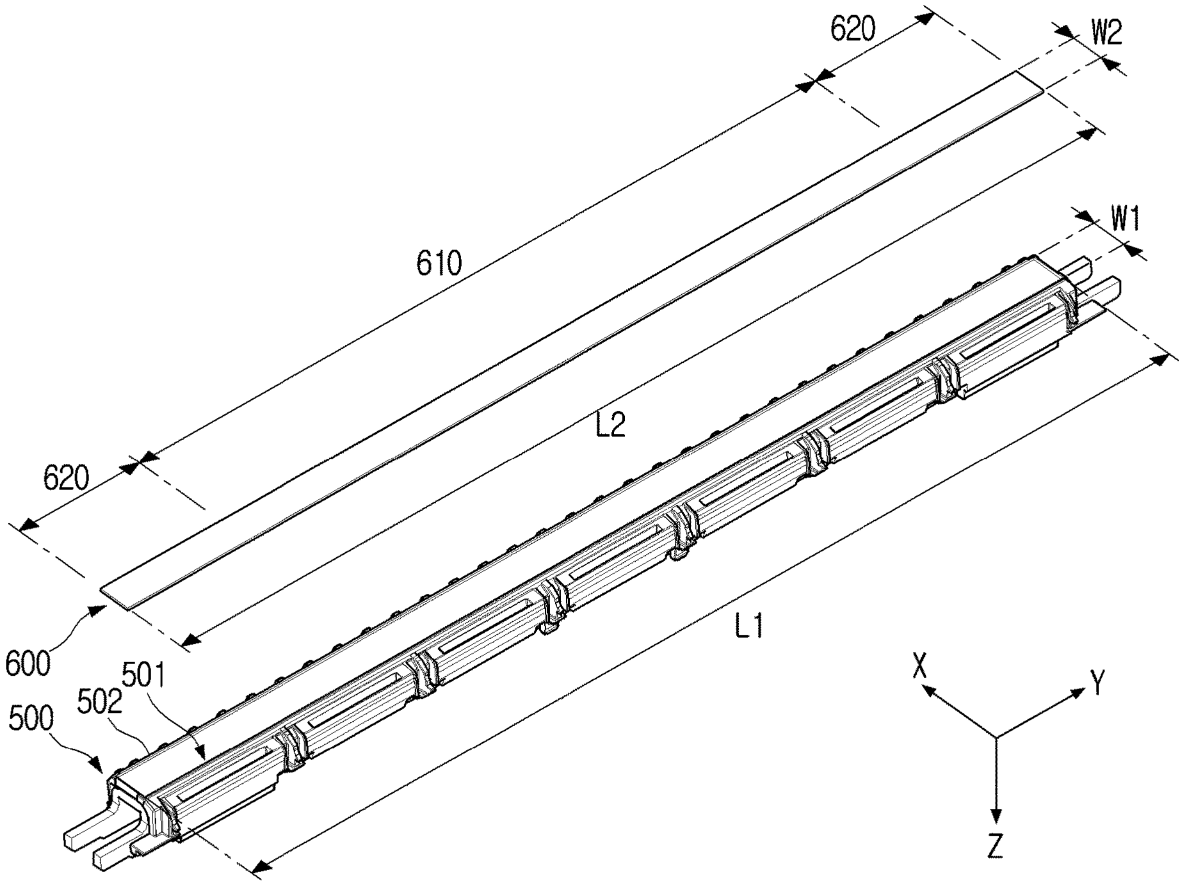
FIG. 6 is an exploded perspective view of a heat transfer member and a nip forming member according to an example.
Figure 7:
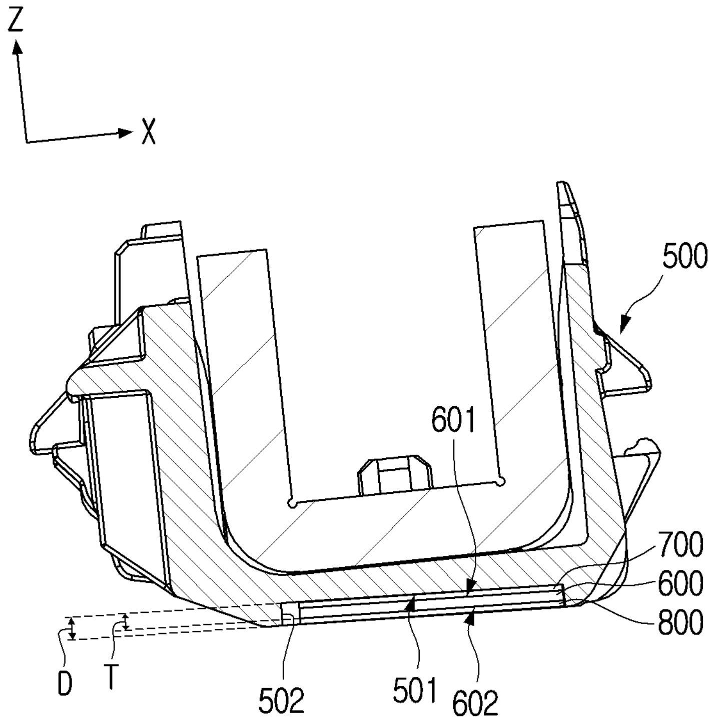
FIG. 7 is a cross-sectional view illustrating a state in which a heat transfer member is mounted to a nip forming member according to an example.

FIG. 6 is an exploded perspective view of a heat transfer member and a nip forming member according to an example. FIG. 7 is a cross-sectional view illustrating a state in which a heat transfer member is mounted to a nip forming member according to an example.

Referring to FIG. 6 and FIG. 7, the heat transfer member 600 may include a first area 610 corresponding to a maximum width of a printing medium that may pass the fuser 10 and a second area 620 disposed at both sides of the first area 610.

The maximum width of the printing medium that may pass the fuser 10 may refer to a width of a maximum size paper (e.g., A2, A3, A4, etc.) that is processable by the fuser 10.

In an example, a center area of the fusing belt 200 through which the printing medium may pass may become hotter than both end areas through which the printing medium is not passed. The center area of the fusing belt 200 may correspond with the first area 610 of the heat transfer member 600, and the both end areas of the fusing belt 200 may correspond with the second area 620 of the heat transfer member 600. In addition, heat may be transferred from the fusing belt 200 to the heat transfer member 600 through the nip plate 400. Alternatively, heat may be transferred from the heat transfer member 600 to the fusing belt 200 through the nip plate 400.

The second area 620 of the heat transfer member 600 may become hotter than the first area 610 based on the above-described temperature difference of the fusing belt 200. Accordingly, the heat transfer member 600 may transfer heat from the second area 620 to the first area 610. The heat transferred from the second area 620 to the first area 610 may be transferred to the center area of the fusing belt 200 through the nip plate 400.

Based on the above-described heat movement, a temperature of the center area of the fusing belt 200 through which paper passes and a temperature of the both end areas of the fusing belt 200 through which paper is not passed may become equal. That is, because the fusing belt 200 quickly reaches a thermal equilibrium state as heat is distributed from the both end areas to the center area, damage from overheating may be prevented and a lifespan may be increased.

In addition, the heat which moved to the center area of the fusing belt 200 may be used in fusing the toner, and thereby efficiency of the fuser may be increased.

The heat transfer member 600 may have a length corresponding (e.g., equal) to the nip forming member 500 or shorter than nip forming member 500. For example, a length L2 of the heat transfer member 600 may be shorter than or equal to a length L1 of the nip forming member 500.

In an example, the heat transfer member 600 may have a length shorter than a length of one surface facing the pressure roller 100 of the nip forming member 500. Accordingly, because both ends of the heat transfer member 600 are not directly in contact with the fusing belt 200, damage to the fusing belt 200 may be prevented.

The heat transfer member 600 may have a width shorter than or equal to a width of the nip forming member 500. That is, the width W2 of the heat transfer member 600 may be shorter than or equal to the width W1 of the nip forming member 500. Accordingly, because the heat transfer member 600 is not in direct contact with the fusing belt 200, damage to the fusing belt 200 may be prevented.

The heat transfer member 600 may include at least one of graphite, aluminum, copper, or the like. For example, the heat transfer member 600 may include a material with a high thermal conductivity in a surface direction such as a natural graphite, an artificial graphite, or the like. Additionally, the heat transfer member 600 may include a metal material having a high isotropic thermal conductivity.

Accordingly, based on the heat transfer member 600 including a material with high thermal conductivity, heat may be easily transferred from the second area 620 to the first area 610.

The fuser 10 may further include a tape member 700 to attach the heat transfer member 600 to one surface 501 which faces the pressure roller 100 of the nip forming member 500. The tape member 700 may be a double-sided tape, and one surface may be attached to the one surface 501 facing the pressure roller 100 of the nip forming member 500 and another surface may be attached to one surface 601 facing the nip forming member 500 of the heat transfer member 600. Accordingly, the heat transfer member 600 may be stably fixed to the nip forming member 500.

The fuser 10 may further include grease 800 which may be applied to one surface 602 facing the pressure roller 100 of the heat transfer member 600. The grease 800 may include a thermal grease with high thermal conductivity. Accordingly, the nip plate 400 and the heat transfer member 600 may transfer heat quickly between each other through the grease 800.

The nip forming member 500 may include an accommodating groove 502 located at the one surface 501 facing the pressure roller 100. The accommodating groove 502 may have a shape corresponding to a shape of the heat transfer member 600.

In an example, at least a part of the heat transfer member 600 may be inserted into the accommodating groove 502 of the nip forming member 500. For example, the heat transfer member 600 may be fully inserted into the accommodating groove 502 (e.g., FIG. 7), or a part of the accommodating groove 502 may be inserted and the remaining part may be disposed at an outer side of the accommodating groove 502. Accordingly, the heat transfer member 600 may not be separated from the nip forming member 500 and may be stably disposed in the accommodating groove 502 of the nip forming member 500 (e.g., FIG. 8).

A thickness T of the heat transfer member 600 may be smaller than a depth D of the accommodating groove 502. The thickness T of the heat transfer member 600 may be a value which includes a thickness of the tape member 700. In an example, the grease 800 may be applied to the one surface 602 facing the pressure roller 100 of the heat transfer member 600, and fill between the heat transfer member 600 and the nip plate 400.

Accordingly, the nip plate 400 and the heat transfer member 600 may not include an air layer having high thermal resistance therebetween, and may transfer heat quickly between each other through the grease 800 having low thermal resistance.

Figure 8:
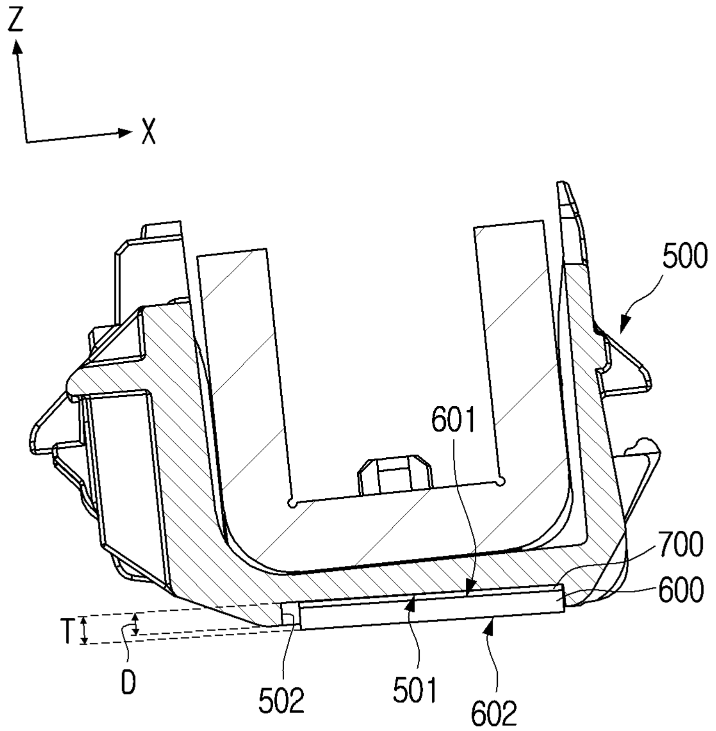
FIG. 8 is a cross-sectional view illustrating a state in which a thickness of a heat transfer member is greater than a depth of an accommodating groove of a nip forming member according to an example.

FIG. 8 is a cross-sectional view illustrating a state in which a thickness of a heat transfer member is greater than a depth of an accommodating groove of a nip forming member according to an example.

Referring to FIG. 8, the thickness T of the heat transfer member 600 may be greater than the depth D of the accommodating groove 502. The thickness T of the heat transfer member 600 may be a value which includes the thickness of the tape member 700. At this time, based on coupling the nip plate 400 to the nip forming member 500, the one surface 602 facing the pressure roller 100 of the heat transfer member 600 may be in contact with the nip plate 400. Accordingly, heat may be quickly transferred from the fusing belt 200 to the heat transfer member 600 through the nip plate 400. In addition, because the heat transfer member 600 and the nip plate 400 are already in contact, the applying of the grease 800 to the one surface 602 of the heat transfer member 600 may be omitted.

In the above, various examples have been described. The terms used herein are to describe the disclosure, and are not to be construed as limiting the disclosure. Various modifications and changes may be made to the disclosure based on the context. Accordingly, unless specified otherwise, the disclosure may be variously modified and changed within the scope of the disclosure.

What is claimed is:

1. A fuser, comprising:

a rotatable pressure roller;

a fusing belt to externally contact the pressure roller;

a heater inside the fusing belt to heat the fusing belt;

a nip plate, including a surface facing the pressure roller, to internally contact the fusing belt;

a nip forming member inside the fusing belt to press the nip plate toward the pressure roller; and a heat transfer member, between the nip plate and the nip forming member, comprising a first area corresponding to a maximum width of a printing medium that is to pass the fuser and a second area at both sides of the first area, wherein the nip forming member comprises an accommodating groove at one surface of the nip forming member facing the pressure roller, and at least a part of the heat transfer member is located in the accommodating groove, wherein a thickness of the heat transfer member is greater than a depth of the accommodating groove, wherein the nip forming member comprises fastening protrusions which protrude from side surfaces of the nip forming member, and wherein the nip plate comprises fastening holes through which the fastening protrusions are to pass.

2. The fuser of claim 1, wherein a length of the heat transfer member is shorter than or equal to a length of the nip forming member.

3. The fuser of claim 1, wherein a width of the heat transfer member is shorter than or equal to a width of the nip forming member.

4. The fuser of claim 1, wherein the heat transfer member includes at least one of graphite, aluminum, or copper.

5. The fuser of claim 1, further comprising:

a tape member to attach the heat transfer member to one surface of the nip forming member facing the pressure roller.

6. The fuser of claim 1, further comprising:

a grease applied to one surface of the heat transfer member facing the pressure roller.

7. The fuser of claim 1, wherein a thickness of the heat transfer member is smaller than a depth of the accommodating groove, and wherein the fuser further comprises grease which is applied to one surface of the heat transfer member facing the pressure roller and filled between the heat transfer member and the nip plate.

8. The fuser of claim 1, wherein a cross-section of the heat transfer member has a rectangular shape.

9. The fuser of claim 1, wherein the fastening protrusions further protrude from the side surfaces of the nip forming member as the fastening protrusions are disposed farther from the pressure roller.

10. An image forming apparatus, comprising:

a photosensitive drum on which an electrostatic latent image is to be formed;

a development device to supply a toner to the electrostatic latent image to form a toner image on a printing medium; and a fuser to press the printing medium, wherein the fuser comprises:

a rotatable pressure roller;

a fusing belt to externally contact with the pressure roller;

a heater inside the fusing belt to heat the fusing belt;

a nip plate, including a surface facing the pressure roller, to internally contact the fusing belt;

a nip forming member inside the fusing belt to press the nip plate toward the pressure roller; and a heat transfer member, between the nip plate and the nip forming member, comprising a first area corresponding to a maximum width of the printing medium that is to pass the fuser and a second area at both sides of the first area, wherein the nip forming member comprises an accommodating groove at one surface of the nip forming member facing the pressure roller, and at least a part of the heat transfer member is located in the accommodating groove, wherein a thickness of the heat transfer member is greater than a depth of the accommodating groove, wherein the nip forming member comprises fastening protrusions which protrude from side surfaces of the nip forming member, and wherein the nip plate comprises fastening holes through which the fastening protrusions are to pass.

11. The image forming apparatus of claim 10, wherein a length of the heat transfer member is shorter than or equal to a length of the nip forming member.

* * * * *